(12) United States Patent
Hower et al.

(10) Patent No.: US 12,303,974 B2
(45) Date of Patent: May 20, 2025

(54) THREE-DIMENSIONAL PRINTING (71) Applicant: PERIDOT PRINT LLC, Palo Alto, CA (US)

(72) Inventors: Jason C. Hower, Corvallis, OR (US); Mohammed S. Shaarawi, Corvallis, OR (US); Vladek P. Kasperchik, Corvallis, OR (US); James McKinnell, Corvallis, OR (US); Jennifer L. Wu, Corvallis, OR (US)

(73) Assignee: PERIDOT PRINT LLC, Palo Alto, CA (US)

(*) Notice: Subject to any disclaimer, the term of this patent is extended or adjusted under 35 U.S.C. 154(b) by 0 days.

(21) Appl. No.: 18/628,434

(22) Filed: Apr. 5, 2024

(65) Prior Publication Data
US 2024/0246147 A1 Jul. 25, 2024

Related U.S. Application Data (63) Continuation of application No. 17/047,513, filed as application No. PCT/US2018/058003 on Oct. 29, 2018, now Pat. No. 11,958,110.

(51) Int. Cl.
*B22F 10/00* (2021.01)
*B22F 1/107* (2022.01)
*B22F 10/14* (2021.01)
*B22F 10/47* (2021.01)
*B33Y 10/00* (2015.01)

(52) U.S. Cl.
CPC ............ *B22F 10/14* (2021.01); *B22F 1/107* (2022.01); *B22F 10/47* (2021.01); *B33Y 10/00* (2014.12)

(58) Field of Classification Search
CPC .......... B22F 10/14; B22F 1/107; B22F 10/47; B22F 3/1021; B22F 10/40; B33Y 10/00; B33Y 40/20; B33Y 70/00; Y02P 10/25
See application file for complete search history.

(56) References Cited

U.S. PATENT DOCUMENTS

| 5,740,941 A | 4/1998 | Lemelson |
| 2009/0031922 A1 | 2/2009 | Rengaswamy et al. |

(Continued)

FOREIGN PATENT DOCUMENTS

| CN | 106515000 A | 3/2017 |
| CN | 107548347 A | 1/2018 |

(Continued)

*Primary Examiner* — Anthony M Liang
*Assistant Examiner* — Danny N Kang
(74) *Attorney, Agent, or Firm* — Dierker & Kavanaugh, P.C.

(57) ABSTRACT

In an example of a method for three-dimensional printing, a first amount of a binding agent is selectively applied, based on a 3D object model, to individual build material layers of a particulate build material including metal particles to forming an intermediate structure. The binding agent and/or a void-formation agent is selectively applied, based on the 3D object model, to at least one interior layer of the individual build material layers so that a total amount of the binding agent, the void-formation agent, or both the binding agent and the void-formation agent in the at least one of the individual build material layers is greater than the first amount. This patterns an area that is to contain voids. The intermediate structure is heated to form a 3D structure including a void-containing breakable connection.

19 Claims, 5 Drawing Sheets (56) References Cited

U.S. PATENT DOCUMENTS

| | | |
|---|---|---|
| 2010/0189901 A1 | 7/2010 | Chung et al. |
| 2015/0147539 A1 | 5/2015 | Thomas et al. |
| 2016/0133396 A1 | 5/2016 | Hsieh |
| 2017/0266882 A1 | 9/2017 | Yan et al. |
| 2017/0297097 A1 | 10/2017 | Gibson et al. |
| 2017/0297106 A1 | 10/2017 | Myerberg et al. |
| 2018/0001551 A1 | 1/2018 | Blacker |
| 2018/0142108 A1 | 5/2018 | Lewis et al. |

FOREIGN PATENT DOCUMENTS

| | | |
|---|---|---|
| CN | 107567379 A | 1/2018 |
| EP | 3700737 A1 | 9/2020 |
| JP | 2016-196137 A | 11/2016 |
| WO | 2016/118151 A1 | 7/2016 |
| WO | 2017/014785 A1 | 1/2017 |
| WO | 2017/069778 A1 | 4/2017 |
| WO | 2018/156207 A1 | 8/2018 |
| WO | 2019/168550 A1 | 9/2019 |

THREE-DIMENSIONAL PRINTING

CROSS REFERENCE TO RELATED APPLICATIONS

This application is a continuation of U.S. application Ser. No. 17/047,513, filed Oct. 14, 2020, which itself is a 371 National Stage Entry of International Application No. PCT/US2018/058003, filed on Oct. 29, 2018, the contents of each of which are incorporated herein by reference in their entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Metallic structures may be three-dimensionally printed using a binding agent, and a layer-by-layer patterning process during which the binding agent is selectively applied to build material layers. The patterned layers may be exposed to low temperature heating, which drives off at least some of the binding agent solvent(s) and enables binder from the binding agent to hold the patterned build material particles together. This forms a patterned intermediate part. The patterned intermediate part may be exposed to high temperature heating, which removes the binder and sinters the particulate build material particles together. This forms a final 3D printed part.

In the examples disclosed herein, voids may be controllably formed at particular locations in the interior of a three-dimensional metallic structure (e.g., between at least a portion of a part and at least a portion of a support structure). The voids may define a breakable connection between a 3D part and a 3D support structure. The location at which the voids will form in the three-dimensional (3D) structure can be defined during the layer-by-layer patterning process, and thus does add additional processing to the 3D printing process. Moreover, void formation may be controlled through the amount of fluid applied, and thus, in some examples, does not introduce new materials into the 3D printing process.

Definitions

Throughout this disclosure, it is to be understood that terms used herein will take on their ordinary meaning in the relevant art unless specified otherwise. Several terms used herein and their meanings are set forth below.

The singular forms "a", "an", and "the" include plural referents unless the context clearly dictates otherwise.

The terms comprising, including, containing and various forms of these terms are synonymous with each other and are meant to be equally broad.

The term "build material support structure" refers to at least one layer of build material that is patterned with the binding agent and that provides support for i) an additional layer of build material that is patterned with a void-formation agent, ii) additional layer(s) of build material that are patterned with the binding agent, and/or iii) patterned layers during sintering.

As used herein, the term "intermediate structure" may refer to the patterned intermediate part and the build material support structure temporarily bound together by a patterned breakable connection.

As used herein, the term "patterned intermediate part" refers to an intermediate part that has a shape representative of the final 3D printed part, and that includes build material particles weakly bound together by one or more components of the binding agent and/or by attractive force(s) between the build material particles and the binding agent. In some instances, the mechanical strength of the patterned intermediate part is such that it cannot be handled or extracted from a build platform. In other examples, water and other solvent(s) may be removed (e.g., evaporated) to strengthen the patterned intermediate part. Moreover, it is to be understood that any build material that is not patterned with the binding agent is not considered to be part of the patterned intermediate part, even if it is adjacent to or surrounds the patterned intermediate part. The patterned intermediate part may be known as a green part, but it is to be understood that the term "green" when referring to the patterned intermediate/green part does not connote color, but rather indicates that the part is not yet fully processed.

Also as used herein, a "patterned breakable connection" refers to a layer of build material patterned with a total amount of the binding agent, void-formation agent, or both the binding agent and the void-formation agent, where the total amount is greater than an amount of the binding agent used to pattern the patterned intermediate part and the build material support structure. The patterned breakable connection may be positioned between at least a portion of the build material support structure and at least a portion of the patterned intermediate part.

As used herein, the terms "3D printed part or object," "3D part," and "3D object" refer to a completed, sintered part. The 3D part or object corresponds with a 3D object model.

Also as used herein, the term "3D printed structure" or "3D structure" may refer to the 3D printed part and a 3D support structure temporarily bound together by a void-containing breakable connection.

Still further, as used herein, a "void-containing breakable connection" refers to sintered layer(s) that contain voids and is/are positioned between at least a portion of a 3D support structure and at least a portion of a 3D part.

It is to be understood that the weight percentages provided herein may vary, depending upon the weight percentage of the active components within a solution, dispersion, etc. used to form the binding agent, void-formation agent, etc., and also on the desired weight percentage of the active components within the binding agent, void-formation agent, etc. For example, if a dispersion (to be added to the binding agent) includes 10% of the active component, and the target weight percentage of the active component in the binding agent is 0.01%, then the amount of the dispersion that is added is 0.1% to account for the non-active components in the dispersion.

3D Printing Kits and Multi-Fluid Printing Kits

Figure 1A:
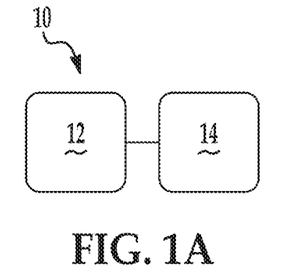
FIGS. 1A and 1B schematically illustrate examples of three-dimensional printing kits disclosed herein.
Figure 1B:
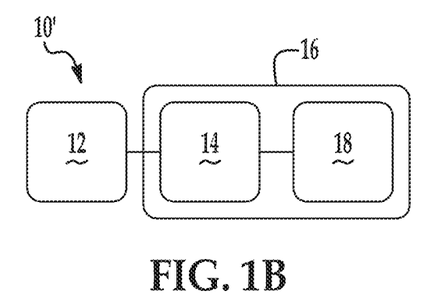

FIGS. 1A and 1B illustrate two examples of 3D printing kits 10, 10' that may be used in the examples disclosed herein.

In FIG. 1A, the 3D printing kit 10 includes a particulate build material 12, which includes from about 80 wt % to 100 wt % of metal particles based on a total weight of the particulate build material 12; and a binding agent 14, which includes an aqueous vehicle and polymer particles in an amount ranging from about 1 wt % to about 30 wt % based on a total weight of the binding agent.

FIG. 1B illustrates an example of a multi-fluid kit 16 for 3D printing, and a 3D printing kit 10' that includes the multi-fluid kit 16. The multi-fluid kit 16 includes a binding agent 14, which includes polymer particles dispersed in a first aqueous vehicle; and a void-formation agent 18, which includes water and/or other liquid components which can be removed by evaporation. This multi-fluid kit 16 may be included in the 3D printing kit 10', which also includes the particulate build material 12, which includes from about 80 wt % to 100 wt % metal particles based on a total weight of the particulate build material 12.

The 3D printing kits 10, 10' may be used to form 3D structures that contain voids at a breakable connection between a part and a support structure. Each of the components of the kits 10, 10' will now be described in more detail.

Particulate Build Material

In examples of the 3D printing kits 10, 10' and methods disclosed herein, the same particulate build material may be used for generating the 3D part, the 3D support structure, and the void-containing breakable connection. The particulate build material includes metal particles.

In an example, the build material particles are a single phase metallic material composed of one element. In this example, the sintering temperature may be below the melting point of the single element.

In another example, the build material particles are composed of two or more elements, which may be in the form of a single phase metallic alloy or a multiple phase metallic alloy. In these other examples, sintering generally occurs over a range of temperatures.

The build material particles may be composed of a single element or alloys. Some examples of the metallic build material particles include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10 Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, SS 430L, Ti-6Al-4V, and Ti-6Al-4V ELI7. While several example alloys have been provided, it is to be understood that other alloys may be used.

The temperature(s) at which the metallic particles sinter is/are above the temperature of the environment in which the patterning portion of the 3D printing method is performed (e.g., patterning ranges from about 18° C. to about 300° C., and sintering ranges from about 500° C. to about 3500° C.). In some examples, the metallic build material particles may have a melting point ranging from about 500° C. to about 3500° C. In other examples, the metallic build material particles may be an alloy having a range of melting points.

The build material particles may be similarly sized particles or differently sized particles. As used herein, particle size refers to the value of the diameter of spherical particles, or in particles that are not spherical, can refer to the longest dimension of that particle.

The particle size may be presented in terms of a particle size distribution. For example, the particle size can be presented as a Gaussian distribution or a Gaussian-like distribution (or normal or normal-like distribution). Gaussian-like distributions are distribution curves that can appear Gaussian in their distribution curve shape, but which can be slightly skewed in one direction or the other (toward the smaller end or toward the larger end of the particle size distribution range).

That being stated, an example Gaussian-like distribution of the metal particles can be characterized generally using "D10," "D50," and "D90" particle size distribution values, where D10 refers to the particle size at the 10th percentile, D50 refers to the particle size at the 50th percentile, and D90 refers to the particle size at the 90th percentile. For example, a D50 value of 25 μm means that 50% of the particles (by number or volume) have a particle size greater than 25 μm and 50% of the particles have a particle size less than 25 μm. Particle size distribution values are not necessarily related to Gaussian distribution curves, but in one example of the present disclosure, the metal particles can have a Gaussian distribution, or more typically a Gaussian-like distribution with offset peaks at about D50. In practice, true Gaussian distributions are not typically present, as some skewing can be present, but still, the Gaussian-like distribution can be considered to be "Gaussian" as used in practice. In one example, the D50 particle size of the particulate build material can range from 0.5 µm to 200 µm. In some examples, the particles can have a D50 particle size distribution value that can range from about 2 µm to about 150 µm, from about 1 µm to about 100 µm, from about 1 µm to about 50 µm, etc. Individual particle sizes can be outside of these ranges, as the "D50 particle size" is defined as the particle size at which about half of the particles are larger than the D50 particle size and about half of the other particles are smaller than the D50 particle size. In yet other examples, the particles can have a D50 particle size distribution value of from about 2 µm to about 100 µm, from about 5 µm to about 75 µm, from about 25 µm to about 50 µm, from about 5 µm to about 15 µm, or from about 3 µm to about 10 µm.

The shape of the particles of the particulate build material can be spherical, non-spherical, random shapes, or a combination thereof.

Binding Agent

The binding agent 14 may be used to pattern build material where it is desirable to form the 3D object and the 3D support structure. In some examples, the binding agent 14 may also be used to pattern build material where it is desirable to form a void-containing breakable connection.

The binding agent 14 includes a binder and an aqueous vehicle (sometimes referred to herein as the first aqueous vehicle).

Examples of suitable binders include latexes (i.e., an aqueous dispersion of polymer particles), aqueous vehicle-soluble polymers such as polyvinyl alcohol, polyvinylpyrrolidone, and combinations thereof.

Examples of polyvinyl alcohol include low weight average molecular weight polyvinyl alcohols (e.g., from about 5,000 to about 50,000), such as SELVOL™ PVOH 17 from Sekisui. Examples of polyvinylpyrrolidones include low weight average molecular weight polyvinylpyrrolidones (e.g., from about 10,000 to about 20,000), such as LUVITEC™ K 17 from BASF Corp.

The polymer particles of the latex may have several different morphologies. For example, the polymer particles may be individual spherical particles containing polymer compositions of hydrophilic (hard) component(s) and/or hydrophobic (soft) component(s) that may be interdispersed according to IPN (interpenetrating networks), although it is contemplated that the hydrophilic and hydrophobic components may be interdispersed in other ways. For another example, the polymer particles may be made of a hydrophobic core surrounded by a continuous or discontinuous hydrophilic shell. For another example, the polymer particle morphology may resemble a raspberry, in which a hydrophobic core is surrounded by several smaller hydrophilic particles that are attached to the core. For still another example, the polymer particles may include 2, 3, or 4 particles that are at least partially attached to one another.

The latex polymer particles may have a weight average molecular weight ranging from about 5,000 to about 500,000. As examples, the weight average molecular weight of the latex particles may range from about 100,000 to about 500,000, or from about 150,000 to about 300,000.

Latex particles may include a heteropolymer including a hydrophobic component that makes up from about 65% to about 99.9% (by weight) of the heteropolymer, and a hydrophilic component that makes up from about 0.1% to about 35% (by weight) of the heteropolymer, where the hydrophobic component may have a lower glass transition temperature than the hydrophilic component. In general, a lower content of the hydrophilic component is associated with easier use of the latex particles under typical ambient conditions. As used herein, typical ambient conditions include a temperature range from about 20° C. to about 25° C., an atmospheric pressure of about 100 kPa (kilopascals), and a relative humidity ranging from about 30% to about 90%. The glass transition temperature of the latex particles may range from about −20° C. to about 130° C., or in a specific example, from about 60° C. to about 105° C.

Examples of monomers that may be used to form the hydrophobic component include $C_1$ to $C_8$ alkyl acrylates or methacrylates, styrene, substituted methyl styrenes, polyol acrylates or methacrylates, vinyl monomers, vinyl esters, ethylene, maleate esters, fumarate esters, itaconate esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, tridecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), 1,3-butadiene, vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a higher $T_g$ hydrophilic monomer, such as an acidic monomer. Examples of acidic monomers that can be polymerized in forming the latex polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In examples, the aqueous dispersion of polymer particles (latexes) may be produced by emulsion polymerization or co-polymerization of any of the previously listed monomers. Other suitable techniques, specifically for generating a core-shell structure, may be used, such as: i) grafting a hydrophilic shell onto the surface of a hydrophobic core, ii) copolymerizing hydrophobic and hydrophilic monomers using ratios that lead to a more hydrophilic shell, iii) adding hydrophilic monomer (or excess hydrophilic monomer) toward the end of the copolymerization process so there is a higher concentration of hydrophilic monomer copolymerized at or near the surface, or iv) any other method known in the art to generate a more hydrophilic shell relative to the core.

In an example, the binder is present in the binding agent 14 in an amount ranging from about 1 wt % to about 30 wt % based on a total weight of the binding agent 14. In another example, the binder is present in the binding agent 14 in an amount ranging from about 2 wt % to about 25 wt % based on the total weight of binding agent 14. As shown in the example formulation in Table 1 (below), these percentages may include both active binder and other non-active components present in a dispersion with the binder that is added to the aqueous vehicle to form the binding agent 14.

In addition to the binder, the binding agent 14 may also include an aqueous vehicle. The aqueous vehicle may include water, co-solvent(s), surfactant(s) and/or dispersing aid(s), antimicrobial agent(s), and/or anti-kogation agent(s).

The co-solvent may be an organic co-solvent present in the binding agent 14 in an amount ranging from about 0.5 wt % to about 50 wt % (based on the total weight of the binding agent 14). It is to be understood that other amounts outside of this range may also be used depending, at least in part, on the jetting architecture used to dispense the binding agent 14. The organic co-solvent may be any water miscible, high-boiling point solvent, which has a boiling point of at least 120° C. Classes of organic co-solvents that may be used include aliphatic alcohols, aromatic alcohols, diols, glycol ethers, polyglycol ethers, lactams, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the binding agent 14 may include 2-pyrrolidone, 1,2-butanediol, 2-methyl-1,3-propanediol, 1-(2-hydroxyethyl)-2-pyrrolidone, or combinations thereof.

The binding agent 14 may also include surfactant(s) and/or dispersing aid(s). Surfactant(s) and/or dispersing aid(s) may be used to improve the wetting properties and the jettability of the binding agent 14. Examples of suitable surfactants and dispersing aids include those that are non-ionic, cationic, or anionic. Examples of suitable surfactants/wetting agents include a self-emulsifiable, non-ionic wetting agent based on acetylenic diol chemistry (e.g., SURFYNOL® SEF from Evonik), a non-ionic fluorosurfactant (e.g., CAPSTONE® fluorosurfactants from DuPont, previously known as ZONYL FSO), and combinations thereof. In a specific example, the surfactant is a non-ionic, ethoxylated acetylenic diol (e.g., SURFYNOL® 465 from Evonik). In other examples, the surfactant is an ethoxylated low-foam wetting agent (e.g., SURFYNOL® 440 or SURFYNOL® CT-111 from Evonik) or an ethoxylated wetting agent and molecular defoamer (e.g., SURFYNOL® 420 from Evonik). Still other suitable surfactants include non-ionic wetting agents and molecular defoamers (e.g., SURFYNOL® 104E from Evonik) or secondary alcohol ethoxylates (commercially available as TERGITOL® TMN-6, TERGITOL® 15-S-7, TERGITOL® 15-S-9, etc. from The Dow Chemical Co.). In some examples, it may be desirable to utilize a surfactant having a hydrophilic-lipophilic balance (HLB) less than 10. Examples of suitable dispersing aid(s) include those of the SILQUEST™ series from Momentive, including SILQUEST™ A-1230. Whether a single surfactant or dispersing aid is used or a combination of surfactants and/or dispersing aids is used, the total amount of surfactant(s) and/or dispersing aid(s) in the binding agent 14 may range from about 0.1 wt % to about 6 wt % based on the total weight of the binding agent 14.

The binding agent 14 may also include antimicrobial agent(s). Suitable antimicrobial agents include biocides and fungicides. Example antimicrobial agents may include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothiazolin-3-one (MIT), 1,2-benzisothiazolin-3-one (BIT), and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. In an example, the binding agent 14 may include a total amount of antimicrobial agents that ranges from about 0.01 wt % to about 1 wt %. In an example, the antimicrobial agent is a biocide and is present in the binding agent 14 in an amount of about 0.1 wt % (based on the total weight of the binding agent 14). These percentages may include both active antimicrobial agent and other non-active components present with the antimicrobial agent.

An anti-kogation agent may also be included in the binding agent 14. Kogation refers to the deposit of dried solids on a heating element of a thermal inkjet printhead. Anti-kogation agent(s) is/are included to assist in preventing the buildup of kogation, and thus may be included when the binding agent 14 is to be dispensed using a thermal inkjet printhead. Examples of suitable anti-kogation agents include oleth-3-phosphate (commercially available as CRODAFOS™ O3A or CRODAFOS™ N-3 acid) or dextran 500k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the binding agent 14 in an amount ranging from about 0.1 wt % to about 1 wt % of the total weight of the binding agent 14.

In some examples, the balance of the binding agent 14 is water (e.g., deionized water). In these examples, the amount of water may vary depending upon the weight percent of the other binding agent components. In other examples, the balance of the binding agent 14 is a solvent (e.g., any of the previously listed co-solvents).

In examples of the binding agent 14, it is desirable that the total volume fraction of solids be about 50 vol. % or less, so that the combined agent is jettable via the desired inkjet printhead (e.g., thermal inkjet printhead, piezoelectric inkjet printhead, etc.).

An example formulation of the binding agent 14 is shown in Table 1.

TABLE 1

| Component Type | Components | Actives (wt %) | Target (wt %) | Formulation (wt %) |
|---|---|---|---|---|
| Co-solvent | 2-methyl-1,3-propanediol | 99.00 | 9.60 | 9.70 |
| | 2-pyrrolidinone | 95.00 | 17.00 | 17.89 |
| Surfactant/ Dispersing aid | Tergitol ® 15-S-7 | 100.00 | 0.90 | 0.90 |
| Antimicrobial | Acticide ® M20 (stock solution) | 10.00 | 0.01 | 0.1 |
| Binder | Acrylic latex dispersion | 41.40 | 16.00 | 38.65 |
| Water | Deionized Water | — | — | Balance |

Void-Formation Agent

In some examples, the void-formation agent 18 may be used to pattern build material where it is desirable to form voids in the 3D structure.

In one example, the void-formation agent 18 includes water.

In another example, the void-formation agent 18 may include water and any other additive, such as co-solvent(s), surfactant(s), and/or anti-kogation agent(s), that improves the jettability of the void-formation agent 18 from an inkjet printhead.

Because the void-formation agent 18 does not include a binder, the void-formation agent 18 may be applied with the binding agent 14 so that the area(s) patterned with the void-formation agent are at least weakly bound in the 3D intermediate structure.

3D Printing Methods

Figure 2:
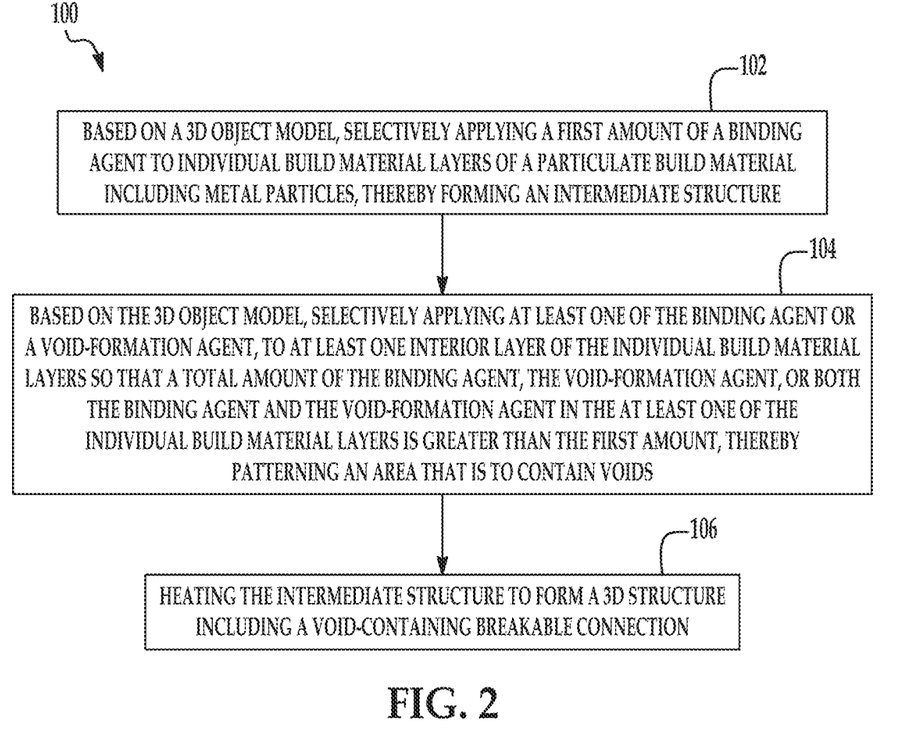
FIG. 2 is a flow diagram illustrating an example of a three-dimensional printing method.

FIG. 2 illustrates an example 3D printing method that results in the formation of voids in a 3D structure. As depicted, the method 100 includes: based on a 3D object model, selectively applying a first amount of a binding agent 14 to individual build material layers of a particulate build material 12 including metal particles, thereby forming an intermediate structure (reference numeral 102); based on the 3D object model, selectively applying at least one of the binding agent 14 or a void-formation agent 18 to at least one of the individual build material layers 12 so that a total amount of the binding agent 14, the void-formation agent 18, or both the binding agent 12 and the void-formation agent 18 in the at least one interior layer of the individual build material layers is greater than the first amount, thereby patterning an area that is to contain voids (reference numeral 104); and heating the intermediate structure to form a 3D structure including a void-containing breakable connection (reference numeral 106).

In the example method 100 disclosed herein, voids are controllably formed by controlling the amount of liquid that is used during patterning. More specifically, increased amounts of liquid (e.g., binding agent 14, void-formation agent 18, or combinations thereof) are applied to the build material where it is desirable to form voids, and decreased amounts of binding agent 14 are applied where it is desirable to form the 3D object and/or the 3D support structure. The amount of the binding agent 14 used to create the 3D object or the 3D support structure and the increased total amount of the binding agent 14 and/or void-formation agent 18 used to create a void-containing area may depend, in part, upon the thickness of the build material layers. In an example, each of the individual build material layers has a thickness ranging from about 30 µm to about 120 µm; the first amount (i.e., the amount used to form the 3D object and the 3D support structure) ranges from about 0.12 grams per square meter (gsm) per 1 µm of build material layer thickness to about 0.26 gsm per 1 µm of build material layer thickness; and the total amount (i.e., the amount used to form the void-containing area(s)) ranges from about 0.3 gsm per 1 µm of build material layer thickness to about 0.6 gsm per 1 µm of build material layer thickness. When more than 0.6 gsm of liquid (e.g., agent 14 and/or 18) per 1 µm of build material layer thickness is used, the void that is generated may be too large and actually extend into the 3D object and/or the 3D support structure.

One or more mechanisms may be involved when increased liquid amounts are used to form voids. Without being bound to any theory, the increased liquid amount may cause capillary compaction or densification of the patterned build material particles, leaving voids among the densified particles. Also without being bound to any theory, the increased liquid amount may cause more of a physical disturbance of the patterned build material particles and their spatial location, which may slow down sintering of those particles and create the voids. For example, some of the build material particles may be pushed by the fluid so that, during sintering, the particles cannot efficiently neck and consolidate. The area(s) that are patterned with additional liquid(s) become area(s) that contain void(s) in the breakable connection that is defined between at least a portion of the 3D object and at least a portion of the 3D support structure. The weakness of the breakable connection is dependent, in part, upon the number of voids as well as the void dimensions. The larger the void dimensions, the weaker the breakable connection.

Figure 3:
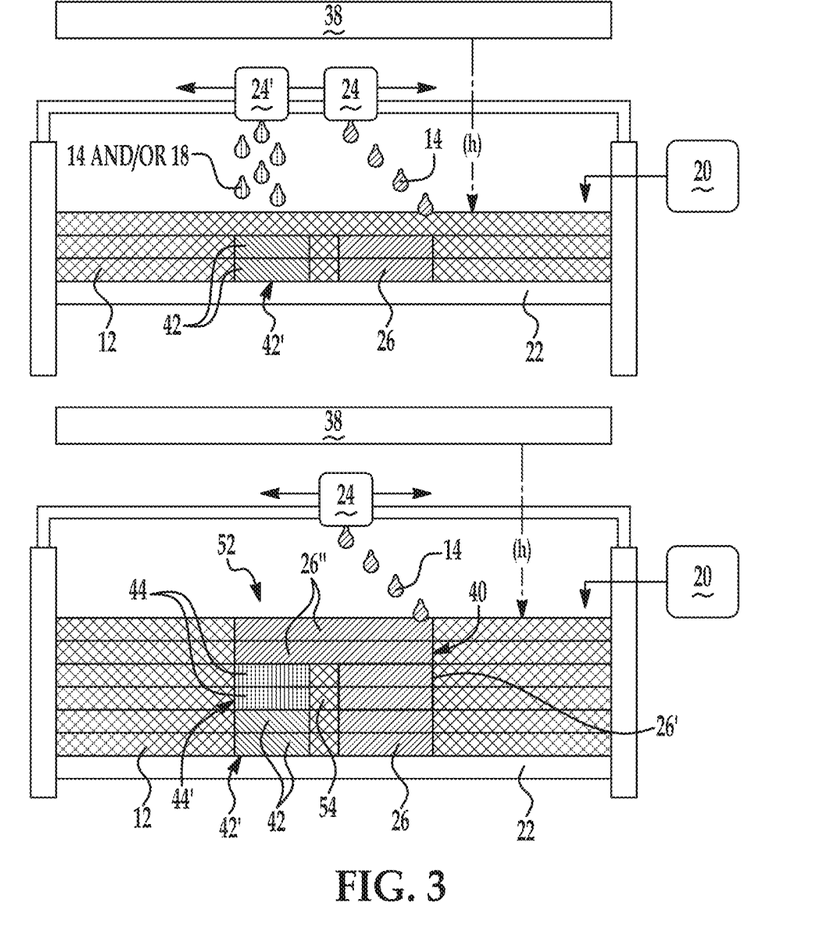
FIG. 3 is a schematic flow diagram that illustrates patterning to form voids at a breakable connection between a 3D object and a 3D support structure in accordance with another example three-dimensional printing method disclosed herein.

Reference is now made to FIG. 3, which illustrates an example of the method 100 used to form voids in the breakable connection between a 3D part and a support structure.

In some 3D printing methods, sections of a patterned intermediate part may not directly be supported by the build platform 22 during the patterning process, and/or may not be supported by a heating mechanism platform during the sintering process. A lack of support can lead to deformation of those sections during patterning and/or sintering. The lack of support may be undesirable because it may render the final finished part otherwise unusable, aesthetically unpleasing, etc. In the example method shown in FIG. 3, a build material support structure 42' (hatched with left-slanted (\) lines) is built as the patterned intermediate part 40 (hatched with right slanted (/) lines) is built, which provides support to the patterned intermediate part 40 during patterning. Also in this example, the build material support structure 42' is temporarily bound to the patterned intermediate part 40 through a patterned breakable connection 44' (hatched with vertical lines). Thus, the entire intermediate structure 52 can be moved to a sintering device, and the build material support structure 42' can provide support to any overlying portion of the patterned intermediate part 40 during sintering.

To create a void-containing breakable connection (46, FIG. 4) between a 3D object (34, FIG. 4) and a support structure (50, FIG. 4), an example of the method 100 may include: patterning build material layers of a particulate build material 12 including metal particles to form an intermediate structure 52, the patterning including: selectively applying a first amount of a binding agent 14 to define: a build material support structure 42' and a patterned intermediate part 40; and selectively applying i) the binding agent 14, ii) a void-formation agent 18, or iii) both the binding agent 14 and a void-formation agent 18 to define a patterned breakable connection 44' between at least a portion of the build material support structure 42' and at least a portion of the patterned intermediate part 40, wherein a total amount of the binding agent 14 and/or the void-formation agent 18 in the patterned breakable connection 44' is greater than the first amount; and heating the intermediate structure 52 to form a 3D object from the patterned intermediate part, a 3D support structure from the build material support structure; and a void-containing breakable connection from the patterned breakable connection. This example is graphically shown and will be further described in reference to FIG. 3.

In FIG. 3, the particulate build material 12 is deposited from the particulate build material source 20 onto the build platform 22 where it can be spread, flattened or smoothed, such as by a spreader, mechanical roller or other flattening mechanism or technique. The binding agent 14 can be ejected onto the particulate build material 12 from a fluid ejector 24 (such as a thermal inkjet printhead or a piezoelectric inkjet printhead), for example, to provide for selective patterning of the particulate build material 12.

In this example, some of the location(s) of the applied binding agent 14 can be selected to correspond with a layer of a 3D printed object or part, such as from a 3D object model or computer model. These patterned portion(s) of the layers of the particulate build material 12 are shown at reference numeral 26.

Also in this example, some other of the location(s) of the applied binding agent 14 can be selected to correspond with a layer of a 3D support structure, such as from a 3D support structure model or computer model. These patterned portion(s) of the layers of the particulate build material 12 are shown at reference numeral 42. The build material support structure 42' (which includes all of the layers 42) may serve to support at least a portion of the patterned intermediate part 40 (e.g., a portion that is not directly supported by the build platform 22 or an oven platform) during patterning and/or sintering.

After individual layers are patterned with the binding agent 14, the build platform 22 can be dropped a distance of (x), which can correspond to at least the thickness of a patterned layer in one example, so that another layer of the particulate build material 12 can be added thereon and patterned with the binding agent 14, etc. The process can be repeated on a layer by layer basis until all of the desired layers are patterned in accordance with the 3D support structure model and with a portion of a 3D object model.

Figure 4:
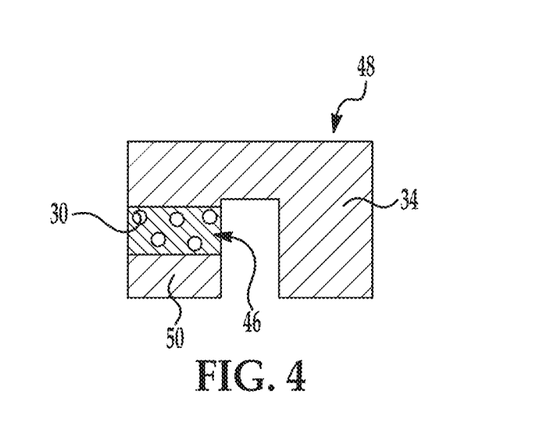
FIG. 4 is a cross-sectional view of the 3D structure formed from the method shown in FIG. 3.

In this example, additional individual layer(s) (of particulate build material) can be applied and patterned to form a patterned breakable connection 44' on at least a portion of the build material support structure 42'. Portion(s) 44 of the particulate build material layers are patterned with the binding agent 14 and/or with the void-formation agent 18 (from fluid ejector 24') so that the total amount of the binding agent 14 and/or with the void-formation agent 18 in the portion(s) 44 is greater than the amount of the binding agent 14 applied to pattern the layers or portions of layers (e.g., portions 26) that are to become the 3D printed object or part or the layers or portions of layers (e.g., portions 42) that are to become the 3D support structure. These portion(s) 44 are patterned with more of the agent(s) 14 and/or 18 to define an area that is to contain voids 30. After sintering, the patterned portion(s) 44, which make up the patterned breakable connection 44', will form a void-containing breakable connection 46 of the 3D printed structure 48, as shown in FIG. 4. In an example, the thickness of each of the layers of particulate build material may range from about 30 μm to about 120 μm and the amount of the binding agent 14 and/or void-formation agent 18 used to pattern each portion 44 ranges from about 0.3 gsm per 1 μm of build material layer thickness to about 0.6 gsm per 1 μm of build material layer thickness. This amount of fluid results in larger voids 30, and thus a weaker junction at the breakable connection 46. The dimensions of these voids 30 may be larger than, and in some instances, much larger than the build material layer thickness. Voids 30 having an average diameter/dimension that is a few times (e.g., 2 to 3 times) the build material layer thickness result in severe mechanical strength degradation, which forms a weak connection 46 that is readily breakable.

The number of layers suitable for forming a patterned breakable connection 44' may range from about 2 to about 10.

As shown in FIG. 3, other portions 26' of the additional individual layer(s) are patterned with the binder fluid 14 to pattern additional layers of the 3D intermediate part 40. Because these portions 26' and the portions 44 are in the same layer of particulate build material, it may be desirable for some non-patterned build material 54 to separate these portions 26', 44. The non-patterned build material 54 keeps the 3D intermediate part 40 from attaching to the void-containing breakable connection 46 at multiple surfaces, and thus renders it easier to remove the support structure 50 (FIG. 4) when desirable.

In this example, still more layer(s) of particulate build material can be applied on the patterned breakable connection 42' and on the patterned portions 26, 26' of the 3D intermediate part 40. Portion(s) 26" of these layers may be patterned with the binding agent 14 to pattern the rest of the 3D intermediate part 40 in accordance with the 3D object model.

It is to be understood that the amount of the binding agent 14 that is applied in the portions 26, 26', and 26" and in the portion(s) 42 is sufficient to bind the patterned build material particles, respectively, in the intermediate part 40 and in the build material support structure 42', but forms no voids large enough to survive sintering. The voids formed may be too small to render the part 34 or the support structure 50 easily breakable (e.g., by hand). In an example, these voids have a diameter less than the build material layer thickness. In an example, the thickness of each layer of the particulate build material 12 may range from about 30 μm to about 120 μm and the amount of the binding agent 14 used to pattern each layer of the 3D printed object or part and of the support structure ranges from about 0.12 gsm per 1 μm of build material layer thickness to about 0.26 gsm per 1 μm of build material layer thickness.

As shown in FIG. 3, heat (h) can be used, such as from a heat source 38, at the various layers (or group of layers) to remove water from the binding agent 14 and/or void-formation agent 18 throughout the patterning process. This temperature is 100° C. or less. In one example, heat can be applied from overhead, e.g., prior to application of the next layer of particulate build material 12, or after multiple layers are patterned, etc., and/or can be provided by the build platform 22 from beneath the particulate build material 12 and/or from the particulate build material source 20 (which preheats the particulate build material 12 prior to dispensing it on the build platform 22 or on a previously applied and patterned layer).

After all of the desired layers of particulate build material 12 are patterned with the lower amounts of the binding agent 14 and the higher amounts of the binding agent 14 and/or void-formation agent 18, heating all of the individually patterned layers is performed. This heating is performed at a temperature ranging from about 120° C. to about 200° C. in order to at least substantially evaporate the liquid components of the binding agent 14 and/or the void-formation agent 18. Evaporation of the liquid components may activate the binder to form the 3D intermediate part 40.

The time frame for heating to form the 3D intermediate structure 52 (including the intermediate part 40, the patterned breakable connection 44', and the support structure 44') can vary depending on size of the 3D intermediate structure 52. For example, large structures with a smaller surface to volume ratio may take longer to drive off enough fluid to stabilize the 3D intermediate structure 52, than a smaller object with a larger surface to volume ratio. In some examples, time frames for heating the patterned layers can range from about 10 minutes to about 8 hours; or from about 30 minutes to about 3 hours. In many cases, individual layers can be heated at temperatures at or below 100° C. during the build, and additional, high temperature heating (120° C. to about 200° C.) can occur after patterning, in order to form the 3D intermediate structure 52.

The 3D intermediate structure 52 that is formed is stable enough to be moved to an oven (or other heating device) suitable for de-binding and sintering. The 3D intermediate structure 52 may be extracted from the build material cake or separated from the non-patterned build material (e.g., 54) by any suitable means. In an example, the 3D intermediate structure 52 may be extracted by lifting the 3D intermediate structure 52 from the non-patterned build material. Any suitable extraction tool may be used. In some examples, the 3D intermediate structure 52 may be cleaned to remove non-patterned build material from its surface. In an example, the 3D intermediate structure 52 may be cleaned with a brush and/or an air jet, may be exposed to mechanical shaking, or may be exposed to other techniques that can remove any of the non-patterned build material (e.g., 54). Because the build material support structure 42' is temporarily bound to the patterned intermediate part 40 by the patterned breakable connection 44', the entire structure 52 can be extracted and moved to a heating device. As such, the build material support structure 42' can provide support to the overlying portion of the patterned intermediate part 40 during de-binding and sintering.

De-binding and sintering can take place at elevated temperatures ranging from about 250° C. to about 3500° C.

Heating to de-bind is accomplished at a thermal decomposition temperature that is sufficient to thermally decompose the binder. As such, the temperature for de-binding depends upon the binder in the binding agent 14 that is used. In an example, the thermal decomposition temperature ranges from about 250° C. to about 600° C. In another example, the thermal decomposition temperature ranges from about 300° C. to about 550° C.

The temperature may then be raised in order to achieve sintering. During sintering, the build material particles coalesce to form the 3D object 34 and the 3D support structure 50. Also during sintering, the voids 30 will form in the void-containing breakable connection, i.e., those portion(s) 44 patterned with a greater amount of the agent(s) 14 and/or 18.

The sintering temperature is highly depending upon the composition of the build material particles. Moreover, the sintering temperature may also depend upon the particle size and time for sintering (i.e., high temperature exposure time). During sintering, the 3D intermediate structure 52 may be heated to a temperature ranging from about 80% to about 99.9% of the melting point(s) of the build material particles. In another example, sintering may take place at a temperature ranging from about 90% to about 95% of the melting point(s) of the build material particles. In still another example, sintering may take place at a temperature ranging from about 60% to about 90% of the melting point(s) of the build material particles. In still another example, the sintering temperature may range from about 10° C. below the melting temperature of the build material particles to about 50° C. below the melting temperature of the build material particles. As an example, the sintering temperature may range from about 500° C. to about 3500° C. In another example, the sintering temperature is at least 900° C. An example of a final sintering temperature for bronze is about 850° C., and an example of a final sintering temperature for stainless steel is about 1400° C., and an example of a final sintering temperature for aluminum or aluminum alloys may range from about 550° C. to about 620° C. While these temperatures are provided as sintering temperature examples, it is to be understood that the sintering temperature depends upon the build material particles that are utilized, and may be higher or lower than the provided examples. Heating at a suitable sintering temperature sinters and fuses the build material particles and forms voids 30 in the breakable connection 46.

As shown in FIG. 4, heating at a suitable sintering temperature sinters and fuses the build material particles to form a 3D structure 48 including i) a 3D object 34 from the patterned intermediate part 40, ii) a 3D support structure 50 from the build material support structure 42', and the void-containing breakable connection 46 (which includes voids 30) from the patterned breakable connection 44'.

In this example, the voids 30 are localized to the breakable connection 46, and thus add fragility to the breakable connection 46. As such, the void-containing, irreversibly breakable connection 46 provides a weak junction or a fault line domain between the 3D part/object 34 and the 3D support structure 50. As such, the 3D support structure 50 can be easily removed from the 3D object 34 by breaking the irreversibly breaking connection 46. As such, some examples of the method 100 further include removing the 3D support structure 50 from the 3D object 34 by breaking the void-containing breakable connection 46. Breaking may be accomplished with human hands, or with simple tools, such as pliers and/or a vise. Cutting tools may be used, but may not have to be used in order to break the 3D support structure 50 from the 3D object 34.

In any of the methods disclosed herein, different shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, an example is given herein. It is to be understood that this example is provided for illustrative purposes and is not to be construed as limiting the scope of the present disclosure.

EXAMPLE

Three different parts were three-dimensionally printed using an example of the binding agent (see Table 1). The build material was 316L-22 μm stainless steel powder (D50~14 μm-15 μm) available from "Additive Manufacturing Alloys".

Figure 5A:
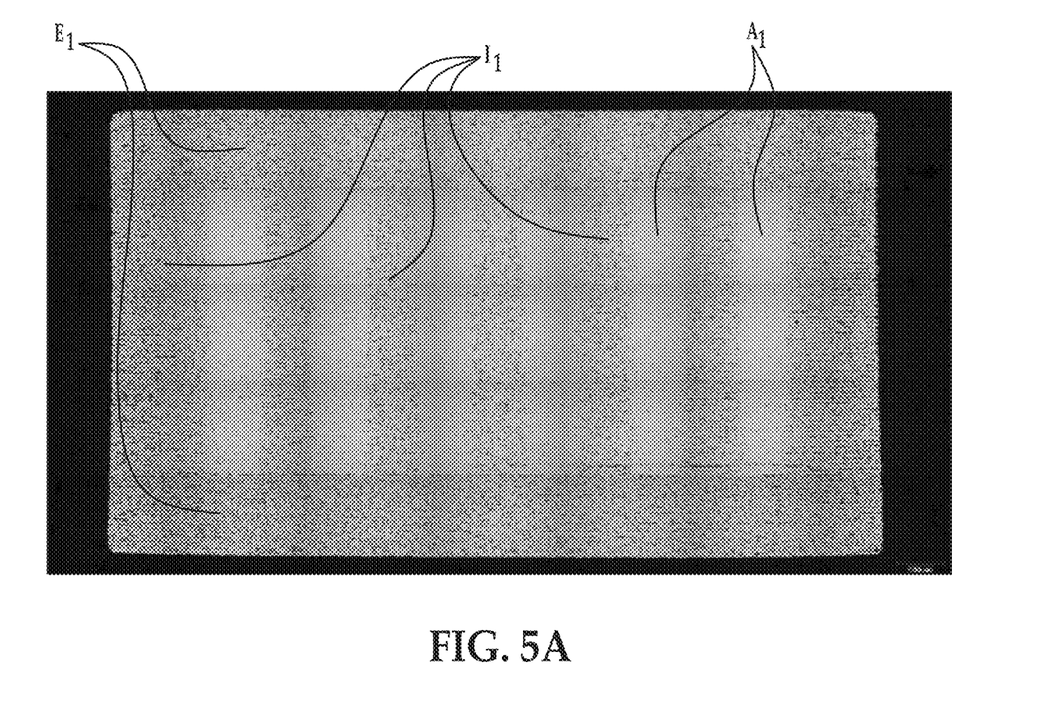
FIG. 5A is an optical micrograph of a cross-section of a top surface of a first 3D printed part.
Figure 6A:
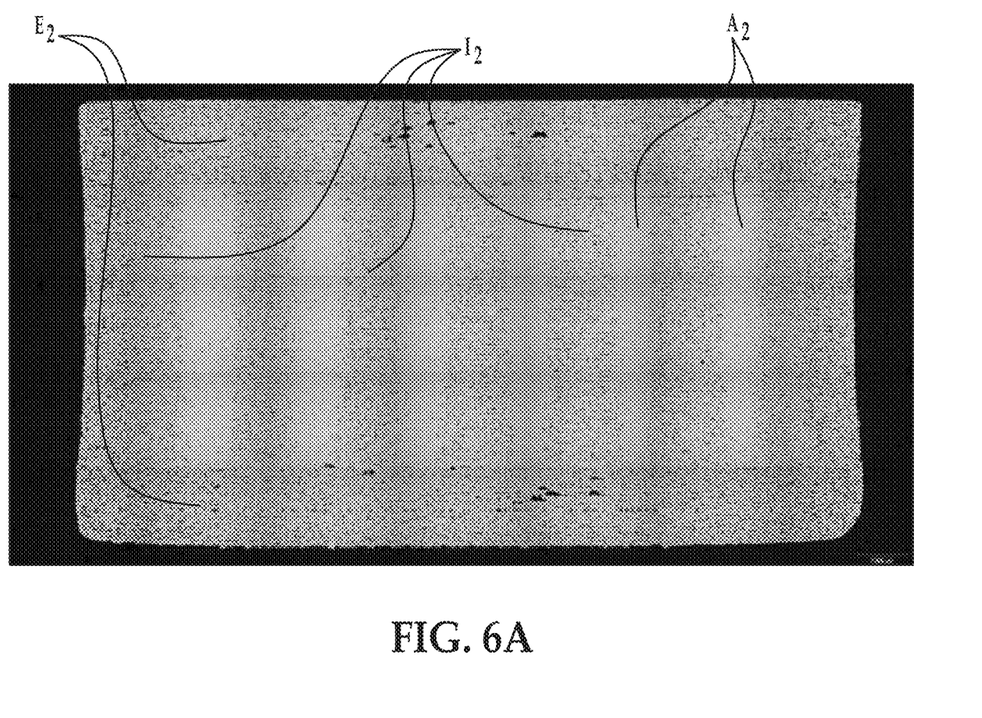
FIG. 6A is an optical micrograph of a cross-section of a top surface of a second 3D printed part having portions formed with a higher amount of binding agent than the first 3D printed part shown in FIG. 5A.
Figure 7A:
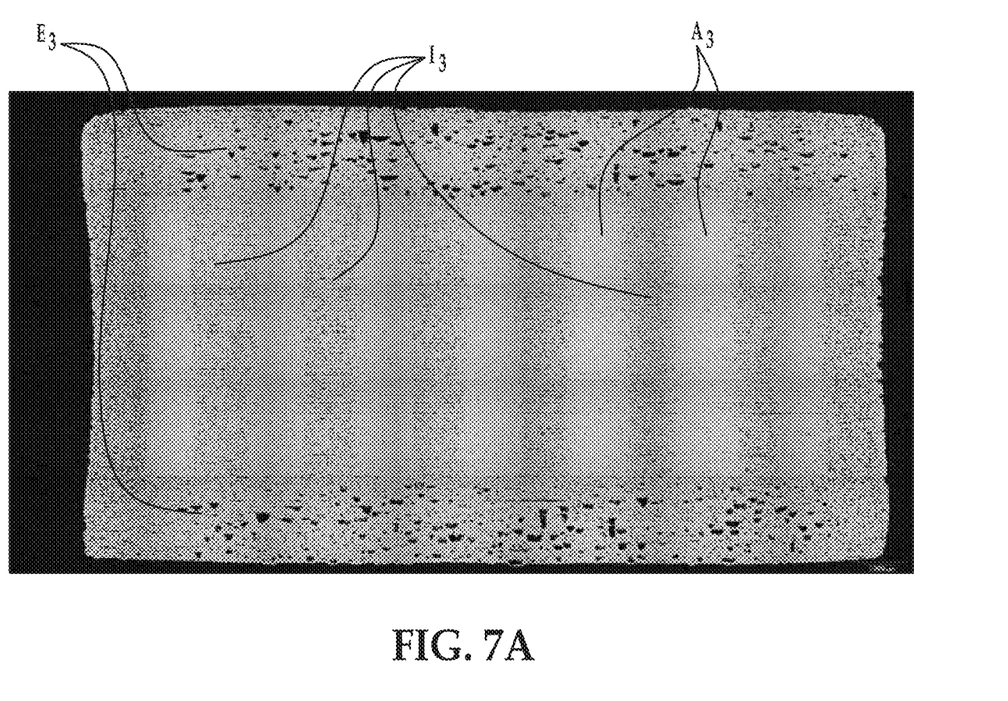
FIG. 7A is an optical micrograph of a cross-section of a top surface of a third 3D printed part having portions formed with a higher amount of binding agent than the first and second 3D printed parts shown in FIGS. 5A and 6A.

Optical micrographs of cross-sections of the top surface of each of the parts were taken, and are shown in FIGS. 5A, 6A and 7A.

Figure 5B:
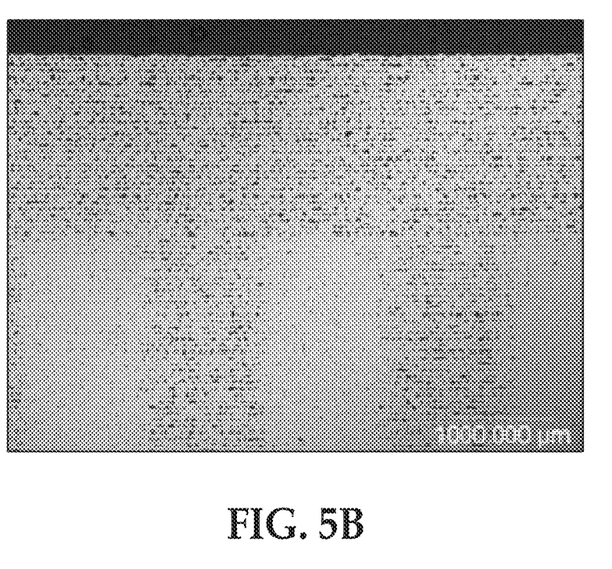
FIG. 5B is a magnified image of a portion of the part shown in FIG. 5A.

To form the first part shown in FIG. 5A, 70 μm layers of the build material were patterned at the longer edges $E_1$ with about 0.2 gsm of the binding agent per 1 μm of build material thickness. Intermittent stripes $I_1$ were patterned with about 0.042 gsm of the binding agent per 1 μm of build material thickness. Alternating stripes $A_1$ remained non-patterned. The first part was sintered at a temperature of about 1380° C. As shown in FIG. 5A and in the magnified portion (~25×) of the part shown in FIG. 5B, very small voids (comparable to or less than the layer thickness) were formed at the edges $E_1$ and at the intermittent stripes $I_1$. The powder sintered in the alternating stripes $A_1$, and these areas had the fewest number of voids due to being non-patterned. The very small voids formed in the patterned portions of the first part were too small a breakaway junction. A further increase in the void dimension should result in significant strength degradation, which would lead to a weaker junction (a more suitable breakable connection)

Figure 6B:
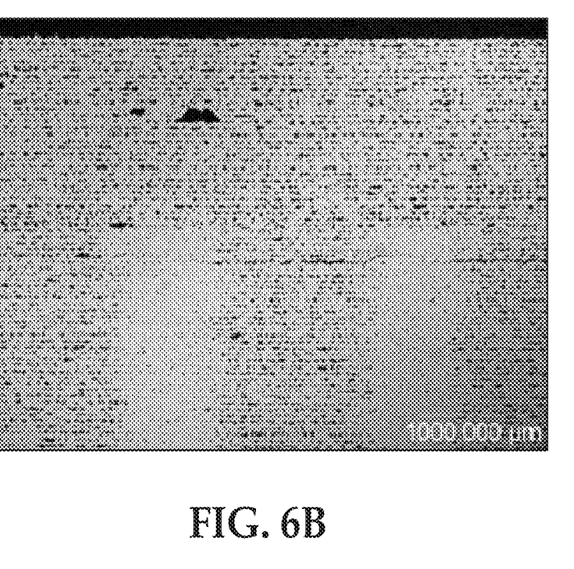
FIG. 6B is a magnified image of a portion of the part shown in FIG. 6A.

To form the second part shown in FIG. 6A, 70 μm layers of the build material were patterned at the edges $E_2$ with about 0.3 gsm of the binding agent per 1 μm build material thickness. Intermittent stripes $I_2$ were patterned with about 0.058 gsm of the binding agent per 1 μm build material thickness. Alternating stripes $A_2$ remained non-patterned. The second part was sintered at a temperature of 1380° C. As shown in FIG. 6A and in the magnified portion (~25×) of the part shown in FIG. 6B, larger voids were formed at the edges $E_2$ than in the intermittent stripes 12 and when compared to those at the edges $E_1$ in the first part. The powder sintered in the alternating stripes $A_2$, and these areas had the fewest number of voids due to being non-patterned. The voids formed at the edges $E_2$ in the second part may be suitable for forming a breakaway junction, for example, when co-located in a particular area by design.

Figure 7B:
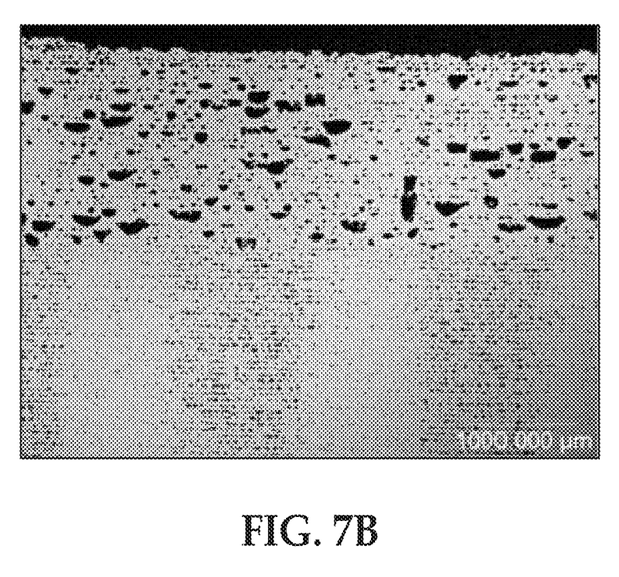
FIG. 7B is a magnified image of a portion of the part shown in FIG. 7A.

To form the third part shown in FIG. 7A, 70 μm layers of the build material were patterned at the edges $E_3$ with about 0.4 gsm of the binding agent per 1 μm build material thickness. Intermittent stripes Is were patterned with about 0.078 gsm of the binding agent per 1 μm build material thickness. Alternating stripes $A_3$ remained non-patterned. The third part was sintered at a temperature of 1380° C. As shown in FIG. 7A and in the magnified portion (~25×) of the part shown in FIG. 7B, larger voids were formed at the edges $E_3$ than in the intermittent stripes Is and when compared to those at the edges $E_1$ in the first part and those at the edges $E_2$ in the second part. The powder sintered in the alternating stripes $A_3$, and these areas had the fewest number of voids due to being non-patterned. The voids formed at the edges $E_3$ in the third part had dimensions that were a few times the build material thickness, and thus would be suitable for forming a breakaway junction, for example, when co-located in a particular area by design.

It is to be understood that the ranges provided herein include the stated range and any value or sub-range within the stated range. For example, from about 500° C. to about 3500° C. should be interpreted to include not only the explicitly recited limits of from about 500° ° C. to about 3500° C., but also to include individual values, such as about 690° C., 1000.5° C., 2055° C., 2750° C., etc., and sub-ranges, such as from about 900° C. to about 3250° C., from about 525° C. to about 2500° C., from about 1020° ° C. to about 2020° C., etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A method for three-dimensional printing, comprising:
   patterning build material layers of a particulate build material including metal particles to form an intermediate structure, the patterning including:
   selectively applying a first amount of a binding agent to define: a build material support structure and a patterned intermediate part; and
   selectively applying the binding agent to define a patterned breakable connection between at least a portion of the build material support structure and at least a portion of the patterned intermediate part, wherein a second amount of the binding agent in the patterned breakable connection is greater than the first amount; and
   heating the intermediate structure to form i) a 3D object from the patterned intermediate part, ii) a 3D support structure from the build material support structure, and iii) a void-containing breakable connection from the patterned breakable connection at an area of the intermediate structure patterned with the binding agent in the second amount.

2. The method as defined in claim 1 wherein:
   each of the build material layers has a thickness ranging from about 30 μm to about 120 μm;
   the first amount ranges from about 0.12 grams per square meter (gsm) per 1 μm of build material layer thickness to about 0.26 gsm per 1 μm of build material layer thickness; and
   the second amount ranges from about 0.3 gsm per 1 μm of build material layer thickness to about 0.6 gsm per 1 μm of build material layer thickness.

3. The method as defined in claim 1, further comprising removing the 3D support structure from the 3D object by breaking the void-containing breakable connection.

4. The method as defined in claim 1 wherein the void-containing breakable connection includes voids, and wherein an average diameter of the voids is equal to or greater than a thickness of each of the build material layers.

5. The method as defined in claim 1 wherein the void-containing breakable connection includes sintered metal particles.

6. The method as defined in claim 1 wherein the binding agent includes a binder and an aqueous vehicle, and wherein the binder is selected from the group consisting of a latex, polyvinyl alcohol, polyvinylpyrrolidone, and combinations thereof.

7. The method as defined in claim 6 wherein the binding agent further includes a co-solvent, a surfactant, an antimicrobial agent, an anti-kogation agent, or combinations thereof.

8. The method as defined in claim 1 wherein each of the selectively applying steps is accomplished using a thermal inkjet printhead or a piezoelectric inkjet printhead.

9. The method as defined in claim 1 wherein the 3D object formed at areas patterned with the first amount of the binder agent is free of voids.

10. A method for three-dimensional printing, comprising:
 patterning build material layers of a particulate build material including metal particles to form an intermediate structure, the patterning including:
  selectively applying a first amount of a binding agent to define: a build material support structure and a patterned intermediate part; and
  selectively applying both the binding agent and a void-formation agent to define a patterned breakable connection between at least a portion of the build material support structure and at least a portion of the patterned intermediate part, wherein a total amount of the binding agent and the void-formation agent in the patterned breakable connection is greater than the first amount; and
 heating the intermediate structure to form i) a 3D object from the patterned intermediate part, ii) a 3D support structure from the build material support structure, and iii) a void-containing breakable connection from the patterned breakable connection at an area of the intermediate structure patterned with both the binding agent and the void-formation agent in the total amount.

11. The method as defined in claim 10 wherein:
 each of the build material layers has a thickness ranging from about 30 µm to about 120 µm;
 the first amount ranges from about 0.12 grams per square meter (gsm) per 1 µm of build material layer thickness to about 0.26 gsm per 1 µm of build material layer thickness; and
 the total amount ranges from about 0.3 gsm per 1 µm of build material layer thickness to about 0.6 gsm per 1 µm of build material layer thickness.

12. The method as defined in claim 10, further comprising removing the 3D support structure from the 3D object by breaking the void-containing breakable connection.

13. The method as defined in claim 10 wherein the void-formation agent includes water.

14. The method as defined in claim 10 wherein the void-containing breakable connection includes voids, and wherein an average diameter of the voids is equal to or greater than a thickness of each of the build material layers.

15. The method as defined in claim 10 wherein the void-containing breakable connection includes sintered metal particles.

16. The method as defined in claim 10 wherein the binding agent includes a binder and an aqueous vehicle, and wherein the binder is selected from the group consisting of a latex, polyvinyl alcohol, polyvinylpyrrolidone, and combinations thereof.

17. The method as defined in claim 16 wherein the binding agent further includes a co-solvent, a surfactant, an antimicrobial agent, an anti-kogation agent, or combinations thereof.

18. The method as defined in claim 10 wherein each of the selectively applying steps is accomplished using a thermal inkjet printhead or a piezoelectric inkjet printhead.

19. The method as defined in claim 10 wherein the 3D object formed at areas patterned with the first amount of the binder agent is free of voids.

* * * * *